(12) United States Patent
Lee

(10) Patent No.: US 10,859,226 B2
(45) Date of Patent: Dec. 8, 2020

(54) LIGHTING DEVICE AND LAMP FOR AUTOMOBILE INCLUDING SAME

(71) Applicant: LG INNOTEK CO., LTD., Seoul (KR)

(72) Inventor: Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/467,236

(22) PCT Filed: Dec. 8, 2017

(86) PCT No.: PCT/KR2017/014358
§ 371 (c)(1),
(2) Date: Jun. 6, 2019

(87) PCT Pub. No.: WO2018/106052
PCT Pub. Date: Jun. 14, 2018

(65) Prior Publication Data
US 2020/0080697 A1   Mar. 12, 2020

(30) Foreign Application Priority Data

Dec. 8, 2016   (KR) .................... 10-2016-0166811

(51) Int. Cl.
| | | |
|---|---|---|
| *F21S 41/24* | (2018.01) | |
| *F21S 4/28* | (2016.01) | |
| *F21S 43/236* | (2018.01) | |
| *F21S 10/00* | (2006.01) | |
| *F21V 8/00* | (2006.01) | |

(52) U.S. Cl.
CPC ................. *F21S 41/24* (2018.01); *F21S 4/28* (2016.01); *F21S 10/005* (2013.01); *F21S 43/236* (2018.01); *G02B 6/0031* (2013.01); *F21V 2200/15* (2015.01)

(58) Field of Classification Search
None
See application file for complete search history.

(56) References Cited

U.S. PATENT DOCUMENTS

| 7,077,554 B2 | 7/2006 | Kim et al. |
|---|---|---|
| 2003/0076690 A1 | 4/2003 | Takahashi |

(Continued)

FOREIGN PATENT DOCUMENTS

| KR | 10-2012-0056805 | 6/2012 |
|---|---|---|
| WO | WO 2015/184074 | 12/2015 |

OTHER PUBLICATIONS

European Search Report dated Oct. 22, 2019 issued in Application No. 17877923.7.

(Continued)

*Primary Examiner* — Vip Patel
(74) *Attorney, Agent, or Firm* — KED & Associates LLP

(57) ABSTRACT

An embodiment provides a lighting device and a lamp for an automobile including the same, the lighting device comprising: a light source module extending in a first direction; and a lens arranged on the light source module and extending in the first direction, wherein the light source module comprises a light guide member extending in the first direction, a light emitting element disposed on one side of the light guide member, and a reflection member disposed on a circumference surface of the light guide member, and the light guide member comprises a light emitting portion extending in the first direction.

10 Claims, 8 Drawing Sheets

(56) References Cited

U.S. PATENT DOCUMENTS

2003/0156416 A1  8/2003  Stopa et al.
2010/0149829 A1  6/2010  Kazaoka et al.
2013/0077345 A1  3/2013  Sato et al.
2013/0272027 A1  10/2013 Hu et al.
2014/0218951 A1  8/2014  Takada
2017/0198881 A1  7/2017  McCreary, Jr. et al.

OTHER PUBLICATIONS

International Search Report dated Apr. 16, 2018 issued in Application No. PCT/KR2017/014358.

LIGHTING DEVICE AND LAMP FOR AUTOMOBILE INCLUDING SAME

CROSS-REFERENCE TO RELATED PATENT APPLICATIONS

This application is a U.S. National Stage Application under 35 U.S.C. § 371 of PCT Application No. PCT/KR2017/014358, filed Dec. 8, 2017, which claims priority to Korean Patent Application No. 10-2016-0166811, filed Dec. 8, 2016, whose entire disclosures are hereby incorporated by reference.

BACKGROUND OF THE INVENTION

Background
1. Field

The present invention relates to a lighting device and a lamp for an automobile including the same.

2. Background

Lighting devices are devices which light dark places using various light sources. The lighting devices are used to emit light to specific objects or places and express atmospheres using desired shapes or colors.

In a case in which a lighting device of the conventional technology is used to express an atmosphere using a desired shape or color, there is a problem in that a configuration of the device is mechanically complex. Accordingly, a degree of design freedom is limited and it is difficult to install or operate the device.

The lighting device of the conventional technology typically provides lighting with a desired shape using members such as a light guide plate and the like. However, such a lighting device generally has a problem in that luminous intensity is decreased.

In addition, due to a limitation of the lighting device which should meet a predetermined standard and a configuration, there is a problem in forming the lighting device to be slim while ensuring desired light uniformity and luminous intensity in a limited place.

The present invention is directed to providing a lighting device capable of increasing luminous intensity and a lamp for an automobile including the same.

The present invention is directed to providing a lighting device capable of realizing various designs and a lamp for an automobile including the same.

Objectives to be solved by embodiments are not limited to the above-described objectives and will include objectives and effects which can be identified by solutions for the objectives and the embodiments described below.

SUMMARY

One aspect of the present invention provides a lighting device including a light source module which extends in a first direction and a lens which is disposed on the light source module and extends in the first direction, wherein the light source module includes a light-emitting portion formed in the first direction, and the lens concentrates light emitted through the light-emitting portion.

The lighting device may further include a housing including a first accommodation portion in which the light source module is disposed and a second accommodation portion in which the lens is disposed.

The housing may include an opening which connects the first accommodation portion and the second accommodation portion, wherein the opening may have a tapered shape in which an area is increased in the direction from the first accommodation portion to the second accommodation portion.

The lens may convert divergent light emitted through the light-emitting portion to parallel light.

A width of the light-emitting portion may range from 1 mm to 10 mm.

The light source module may include: a light guide member which extends in the first direction; a light-emitting element disposed at one side of the light guide member; and a reflection member which covers the light guide member, wherein the light-emitting portion may be disposed on the reflection member to expose the light guide member.

The width of the light-emitting portion may be increased in a direction from the one side to the other side of the light guide member.

A thickness of the light guide member may be decreased in the direction from the one side to the other side.

The lighting device may further include a submember which is disposed under the light guide member and has a thickness which is increased in the direction from the one side to the other side.

A first minimum distance from the one side to the lens may be equal to a second minimum distance from the other side to the lens.

The light source module may include a circuit board, a plurality of light-emitting elements disposed on the circuit board, and a light guide plate including one surface which faces the light-emitting element and the other surface which faces the one surface, wherein light incident on the one surface of the light guide plate from the light-emitting element may be emitted through the other surface.

The light source module may include a light-emitting element, a first lens disposed on the light-emitting element, and a second lens disposed on the first lens, wherein the first lens may serve a light concentration function and the second lens may serve a diffusion function.

According to an embodiment, a linear light source with increased luminous intensity can be realized.

A surface light source having various shapes can be realized. In addition, there are advantages in improving brightness uniformity and reducing a size and a weight thereof.

In addition, the surface light source can be realized with high uniformity.

Various useful advantages and effects of the present invention are not limited to the above-described advantages and may be understood in a process in which specific embodiments are described.

DETAILED DESCRIPTION

Embodiments of the present invention may be modified into different forms or the plurality of embodiments may be combined, and the scope of the present invention is not limited to the embodiments which will be described below.

Although a description given in a specific embodiment is not given in other embodiments, the description may be understood to be descriptions of other embodiments as long as there are no opposite or inconsistent descriptions given.

For example, when a feature of an element A is described in a specific embodiment and a feature of an element B is described in another embodiment, the scope of the present invention includes an embodiment in which the elements A and B are combined even when the embodiment is not clearly described as long as there are no opposite or inconsistent descriptions given.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, in a case in which one element is described as being formed on (or under) an element, such a description may include a case in which one element is formed at an upper side or a lower side with respect to the element.

Hereinafter, embodiments of the present invention will be described in detail with reference to the accompanying drawings so that those skilled in the art may easily perform the present invention.

Figure 1A:
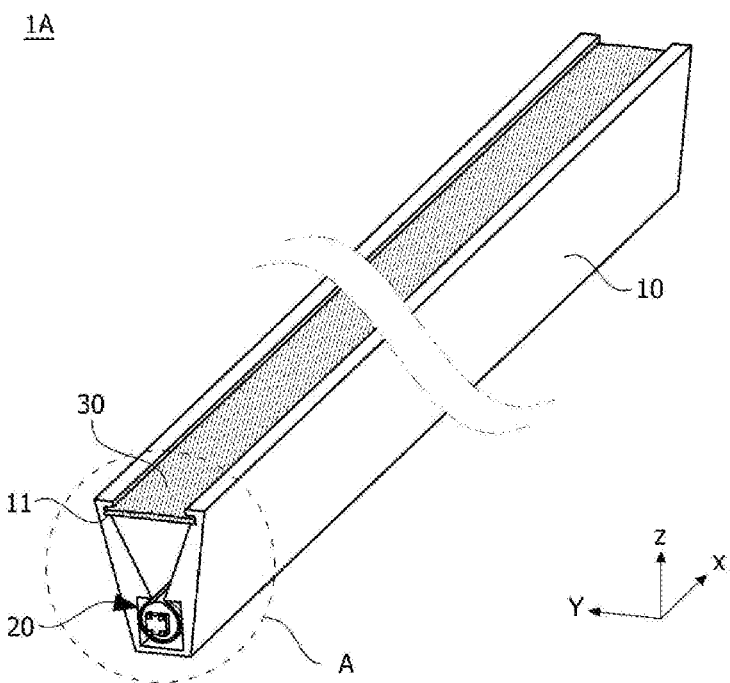
FIG. 1A is a conceptual view illustrating a lighting device according to one embodiment of the present invention.
Figure 1B:
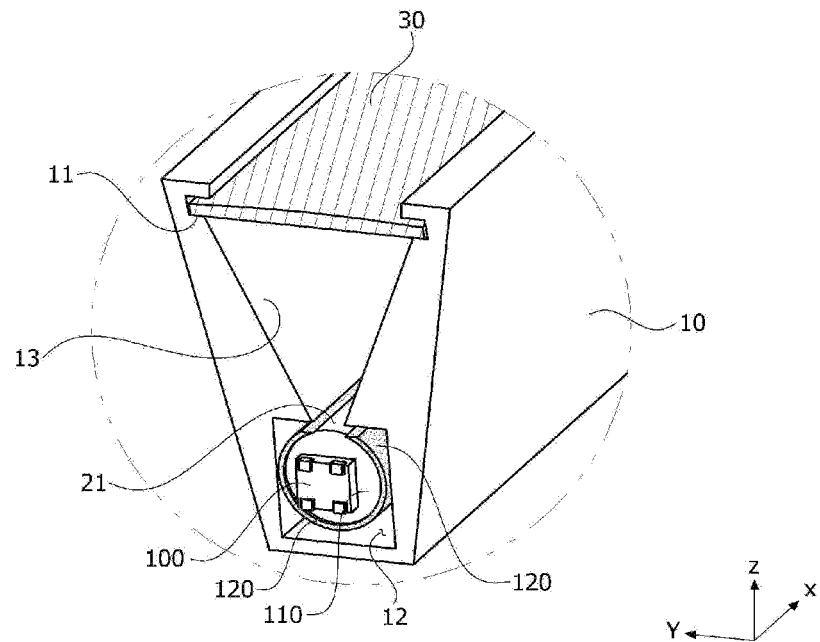
FIG. 1B is an enlarged view illustrating a portion A of FIG. 1A.

FIG. 1A is a conceptual view illustrating a lighting device according to one embodiment of the present invention, and FIG. 1B is an enlarged view illustrating a portion A of FIG. 1A.

Referring to FIGS. 1A and 1B, the lighting device according to the embodiment may include a housing 10, a light source module 20, and a lens 30.

The housing 10 may include a first accommodation portion 12 in which the light source module 20 is disposed and a second accommodation portion 11 in which the lens 30 is disposed. The first accommodation portion 12 may extend in a first direction (X-axis direction) so that the light source module 20 may be inserted into the first accommodation portion 12. The second accommodation portion 11 may be a guide groove in which the lens 30 having a bar shape may be inserted into the guide groove.

An opening 13 may connect the first accommodation portion 12 and the second accommodation portion 11. The opening 13 may have a tapered shape in which an area is increased in a direction from the first accommodation portion 12 to the second accommodation portion 11. Accordingly, the opening 13 may guide light emitted from the light source module 20 to the lens 30. In order to increase light extraction efficiency, an inner wall of the opening 13 may be coated with a reflective material.

A molding member (not shown) may be disposed in at least one among the first accommodation portion 12, the second accommodation portion 11, and the opening 13 of the housing 10. The molding member may fix the light source module 20 and the lens 30 to the housing 10. When the molding member is formed of a transparent material through which light emitted from a light-emitting element 100 may pass, the molding member is not specifically limited. For example, a material of the molding member may also be the same as that of a light guide member 110.

The light source module 20 may have a rod shape which extends in the first direction (X-axis direction). However, the light source module 20 is not necessarily limited thereto, and the light source module 20 may also have a bent shape. The shape of the light source module 20 is not specifically limited. A light-emitting portion 21 may be formed in a portion which faces the lens 30 in the light source module 20.

The lens 30 extends in the first direction (X-axis direction) and concentrates light emitted through the light-emitting portion 21. The lens 30 may convert divergent light emitted from the light source module 20 to parallel light.

The lens 30 may include a plurality of optical patterns (not shown) on one surface of the lens 30. The optical pattern may have a Fresnel shape and diffract light incident on the optical pattern. A height of the optical pattern may be changed in a continuous or discontinuous manner in a direction from a central portion to an edge of the lens 30. The height of the optical pattern may be designed to be decreased in the direction from the central portion to the edge or, conversely, may also be designed to be increased in the direction from the central portion to the edge.

The lens 30 may be a Fresnel lens but is not necessarily limited thereto.

Figure 2:
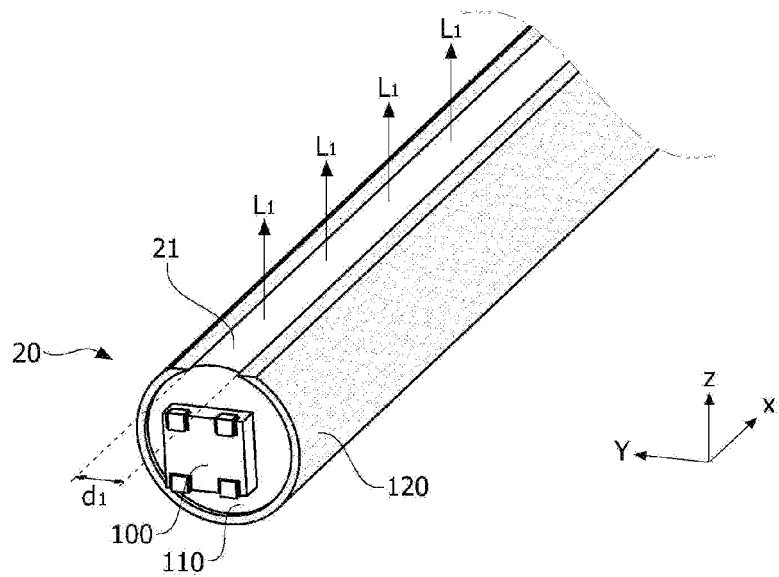
FIG. 2 is an enlarged view illustrating a light source module.
Figure 3:
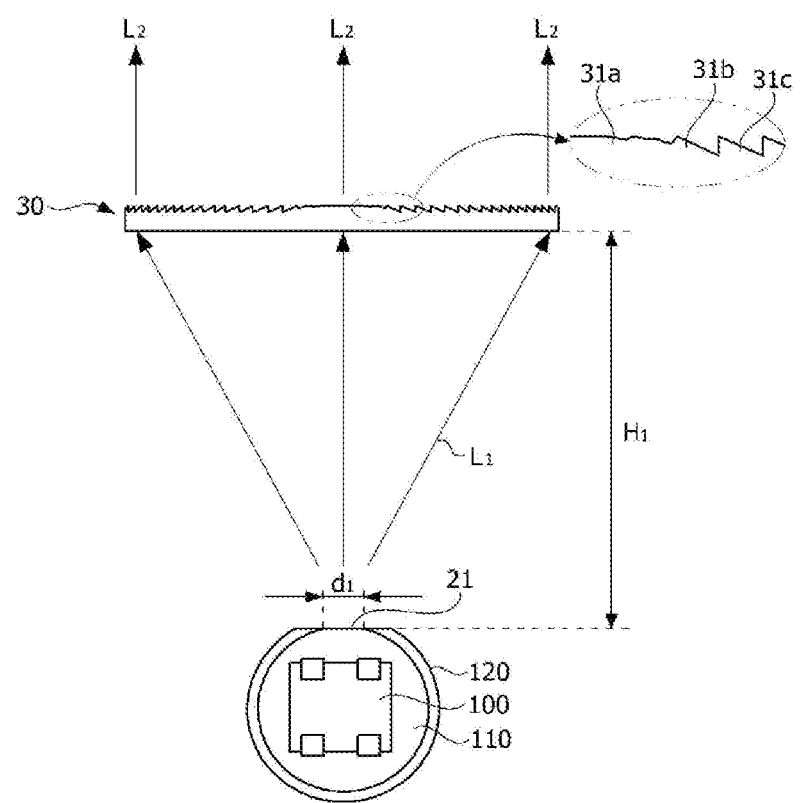
FIG. 3 is a view illustrating a process in which light emitted from the light source module is concentrated.
Figure 4:
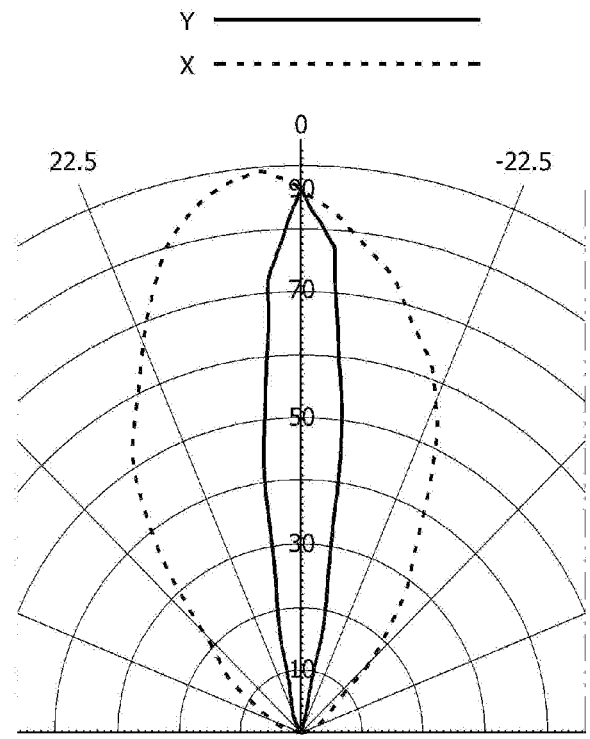
FIG. 4 is a graph showing a light distribution curve of light emitted from the lighting device.

FIG. 2 is an enlarged view illustrating a light source module, FIG. 3 is a view illustrating a process in which light emitted from the light source module is concentrated, and FIG. 4 is a graph showing a light distribution curve of light emitted from the lighting device.

Referring to FIG. 2, the light source module 20 may include the light guide member 110 which extends in the first direction, a light-emitting element 100 disposed at one side of the light guide member 110, and a reflection member 120 which covers an outer circumferential surface of the light guide member 110.

Various kinds of light guide members which may guide light in a longitudinal direction may be applied to the light guide member 110. For example, the light guide member 110 may be a light guide pipe having a predetermined length. The light guide member 110 may be freely bent to have various shapes. For example, although the light guide member 110 is illustrated to have a cylindrical shape, the light guide member 110 is not necessarily limited thereto and may also have a rectangular hexahedron shape or polygonal column shape instead of the cylindrical shape. In addition, an area of the light guide member 110 may be decreased or increased in the first direction (X-axis direction), and in a case in which the area is decreased in the first direction, light of the light-emitting element may be transmitted farther in the first direction (X-axis direction).

Various elements capable of emitting light may be selected as the light-emitting element 100. For example, the light-emitting element 100 may be a light-emitting diode (LED), a laser diode (LD), or an organic LED (OLED) but is not limited thereto.

For example, the light-emitting element 100 may be an LED. The LED may include an N-type conductive semiconductor layer, an active layer, and a P-type conductive semiconductor layer. Each of the N-type conductive semiconductor layer, the active layer, and the P-type conductive semiconductor layer of the LED may be formed of one or more semiconductor materials having a composition formula of AlxInyGa(1-x-y)N ($0 \leq x \leq 1$, $0 \leq y \leq 1$, $0 \leq x+y \leq 1$), such as GaN, InAlGaN, AGaAs, GaP, GaAs, GaAsP, and AlGaInP, but is not limited thereto.

The light-emitting element 100 may also be a light-emitting element package in which a plurality of elements are packaged. For example, red, green, and blue (RGB) light-emitting elements may also be disposed in the light-emitting element 100 and selectively operated to realize a desired color.

The light-emitting element 100 may also be an LD. The LD has advantages in that a divergent angle is easily adjusted and light is highly straight. The LD using even a single chip may provide sufficient optical power needed for a lamp due to high output power thereof. Accordingly, there may be an advantage in simplifying a drive circuit and an optical system.

The reflection member 120 may cover the outer circumferential surface of the light guide member 110. As the reflection member 120 is formed of a material having high reflection efficiency, the reflection member 120 may serve to reduce optical loss. Since an opening of the reflection member 120 is formed in the first direction (X-axis direction), a part of the light guide member 110 may be exposed. Accordingly, the light guide member 110 may include the light-emitting portion 21 which extends in the first direction (X-axis direction).

The reflection member 120 may be formed as a film type and may be formed of a synthetic resin containing a dispersed white pigment to realize a property of reflecting light and a property of facilitating light dispersion.

For example, titanium oxide, aluminum oxide, zinc oxide, lead carbonate, barium sulfate, calcium carbonate, or the like may be used for the white pigment, and polyethylene terephthalate, polyethylene naphthalate, acrylic resin, colicarbonate, polystyrene, polyolefin, cellulosic acid acetate, weather-resistant vinyl chloride, or the like may be used for the synthetic resin, but the present invention is not limited thereto.

The light-emitting portion 21 may be disposed to face the lens 30 and may extend in the first direction. The light-emitting portion 21 may be a portion in which a part of the reflection member 120 is removed and the light guide member 110 is exposed through the part. In order to realize linear light, the light-emitting portion 21 may have a predetermined width d1. The width d1 of the light-emitting portion 21 may be a distance in a second direction (Y-axis direction) perpendicular to the first direction.

While light emitted from the light-emitting element 100 is transmitted in the first direction, some light may be emitted through light-emitting portion 21. Accordingly, the light source module 20 emits linear light L1. That is, the linear light may be light emitted in the first direction (X-axis direction) and in a third direction (Z-axis direction) perpendicular to the second direction (Y-axis direction).

Referring to FIG. 3, the linear light L1 emitted from the light-emitting element 100 may be emitted toward the lens 30 and converted to parallel light L2 by the lens 30. The light-emitting portion 21 may be aligned with a central portion 31a having a dome shape.

Heights of optical patterns 31a, 31b, and 31c may be changed in a continuous or discontinuous manner in the direction from the central portion to the edge of the lens 30. The heights of the optical patterns 31a, 31b, and 31c may be designed to be decreased in the direction from the central portion 31a having the dome shape to edges 31b and 31c, or, conversely, may also be designed to be increased in the direction from the central portion to the edges. An incident surface of the lens 30 may be a flat surface.

The width d1 of the light-emitting portion 21 may range from 1 mm to 10 mm. In a case in which the width d1 of the light-emitting portion 21 is less than 1 mm, there is a problem in that an amount of light and a line width of the light are too small, and in a case in which the width is greater than 10 mm, an amount of light concentrated in the lens 30 becomes too small, and thus light loss may occur.

A distance from the light source module 20 to the lens 30 needs to be maintained to have a focal length H1 of the lens 30. The focal length may be properly adjusted according to a kind of the lens 30, a kind of a light source, and the like. The line width of the linear light emitted from the lighting device may be 10 mm or more. However, the line width is not necessarily limited thereto, and the line width of the linear light emitted from the lighting device may be adjusted by various adjusting factors.

Referring to FIG. 4, it may be seen that light emitted from the lighting device has a narrow view angle in the X-axis direction and a narrow view angle in the Y-axis direction and thus may have a narrow divergent angle. For example, a full width at half maximum (FWHM) may be 40° or less but is not limited thereto. According to the embodiment, the width of the light-emitting portion and/or the distance from the light-emitting portion to the lens, that is, the focal length of the lens, may be adjusted to realize light having narrow light distribution and high luminous intensity.

Figure 5:
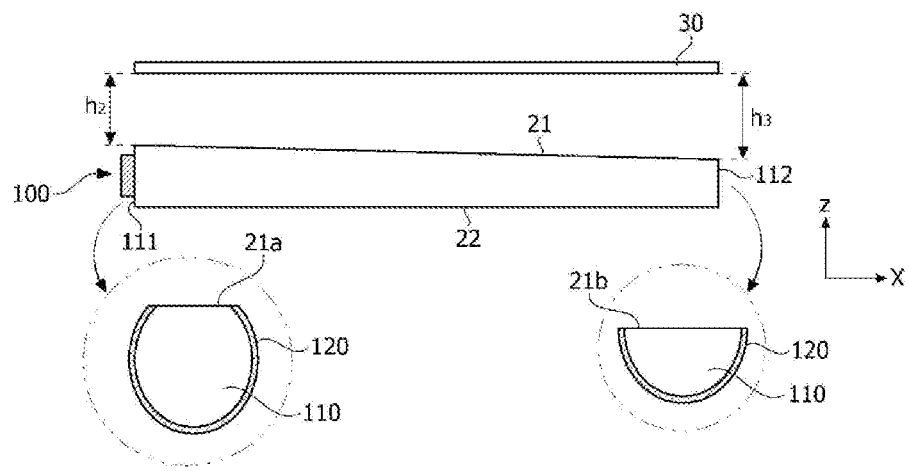
FIG. 5 is a side view showing a state in which the light source module and a lens are spaced apart from each other.
Figure 6:
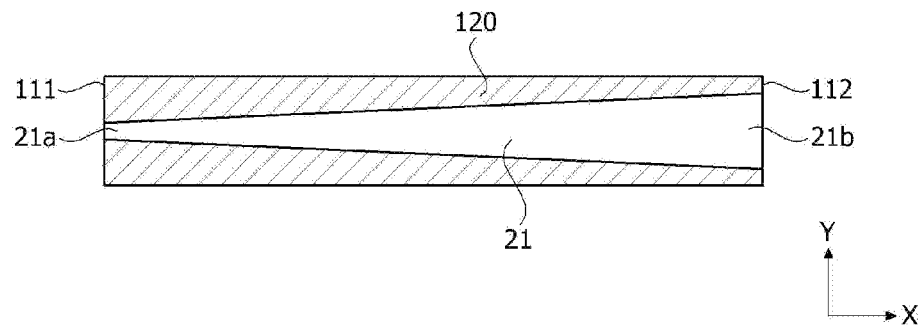
FIG. 6 is a plan view illustrating the light source module.
Figure 7:
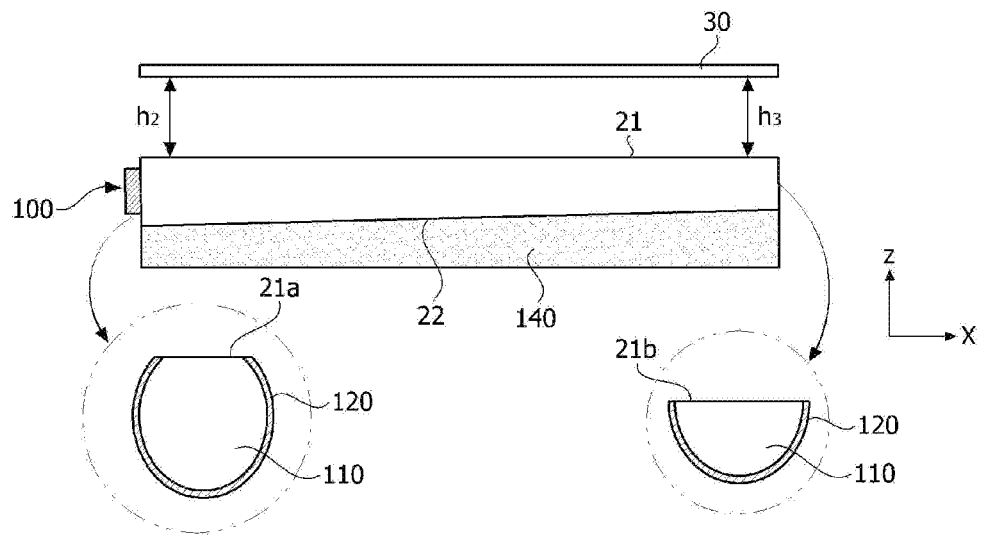
FIG. 7 is a view showing a state in which a distance from the light source module to the lens is constant due to a submember.

FIG. 5 is a side view showing a state in which the light source module and a lens are spaced apart from each other, FIG. 6 is a plan view illustrating the light source module, and FIG. 7 is a view showing a state in which a distance from the light source module to the lens is constant due to a submember.

Referring to FIGS. 5 and 6, light emitted from the light-emitting element 100 is transmitted from the one side 111 to the other side 112 of the light guide member 110, and some of the light may be emitted toward the lens 30 through the light-emitting portion 21.

According to the embodiment, in order to maintain light uniformity in the first direction (X-axis direction), the light guide member 110 may include beads (not shown). Such beads may serve to improve light reflection and diffusion properties.

A density of the beads may be increased in the first direction, that is, away from the one side 111 of the light guide member 110. That is, less beads of the one side 111, in which an amount of light is relatively large, of the light guide member 110 are distributed, and more beads of the other side 112, in which an amount of light is relatively small, of the light guide member 110 are distributed so that uniformity can be improved.

As a result, an amount of emitted light is increased and uniformity is improved. Accordingly, a brightness of the lighting device can be increased.

Contents of the beads may be properly adjusted to achieve a desired light diffusion effect and, more specifically, may be adjusted within a range from 0.01 to 0.3 wt % of a total resin.

The beads may be formed of any one selected from among silicon, silica, glass bubble, Poly(methyl methacrylate)

(PMMA), urethane, Zn, Zr, Al2O3, and acryl, and a particle diameter of the bead may range from 1 µm to 20 µm but is not limited thereto.

A method of improving light uniformity is not limited thereto, and various methods may be applied to improve the light uniformity. For example, an amount of light may also be adjusted by increasing a density of reflective patterns in the first direction or corroding the light guide member 110 in the first direction.

The width of the light-emitting portion 21 may be increased in the first direction (X-axis direction), that is, away from the one side 111 of the light guide member 110. That is, a width of a light-emitting portion 21a at one side may be smaller than a width of a light-emitting portion 21b at the other side.

Since an amount of light of the one side 111 is relatively large, an amount of emitted light of the light-emitting portion may be decreased by decreasing the width of the one side 111. In addition, an amount of emitted light of the other side 112 may be increased by increasing the width of the light-emitting portion. Accordingly, an overall uniformity of linear light may be improved.

A configuration to adjust the width of the light-emitting portion 21 is not specifically limited. For example, after an entirety of the light guide member 110 is coated with the reflection member 120, an etching depth thereof is adjusted in the first direction to increase an area of the light-emitting portion 21. Accordingly, a vertical distance from the light-emitting portion 21 to the lower end portion 22 of the light guide member 110 may be decreased in the first direction (X-axis direction).

A width of the first accommodation portion 12 (see FIG. 1B) may be changed according to the width of the light-emitting portion 21. For example, in a case in which a length of the first accommodation portion 12 in the second direction y is less than a length of the light-emitting portion 21 in the second direction y, light, which should be transmitted to the lens 30, may not be transmitted to the lens 30 by a step of the first accommodation portion 12 and may be reflected to the light guide member 110 or an interior of the first accommodation portion 12. Accordingly, the length of the first accommodation portion 12 in the second direction y may also be changed in the first direction x. For example, a length of one side of the first accommodation portion 12 in the second direction y may be less than a length of the other side of the first accommodation portion 12 in the second direction y.

Referring to FIG. 5, the light source module 20 and the lens 30 may be spaced a predetermined distance from each other. Such a separation distance may be a focal length. Accordingly, an overall distance from the light source module 20 to the lens 30 may be maintained to be uniform in the first direction.

The light source module 20 may be etched more in the first direction so that the thickness thereof may be decreased in the first direction. That is, since the thickness of the light source module 20 is decreased in the first direction, there is a problem in that a focal length of light emitted from the one side 111 of the light guide member 110 does not match a focal length of light emitted from the other side 112 (h2<h3). Accordingly, light uniformity may be degraded.

Referring to FIG. 7, a submember 140 may be disposed under the light source module 20. Such a submember 140 may have a shape in which a thickness thereof is increased in the first direction. Accordingly, when the light source module 20 is mounted on the submember 140, the distance from the light source module 20 to the lens 30 may be controlled to be constant in the first direction (h2=h3). Accordingly, uniformity can be improved.

Figure 8:
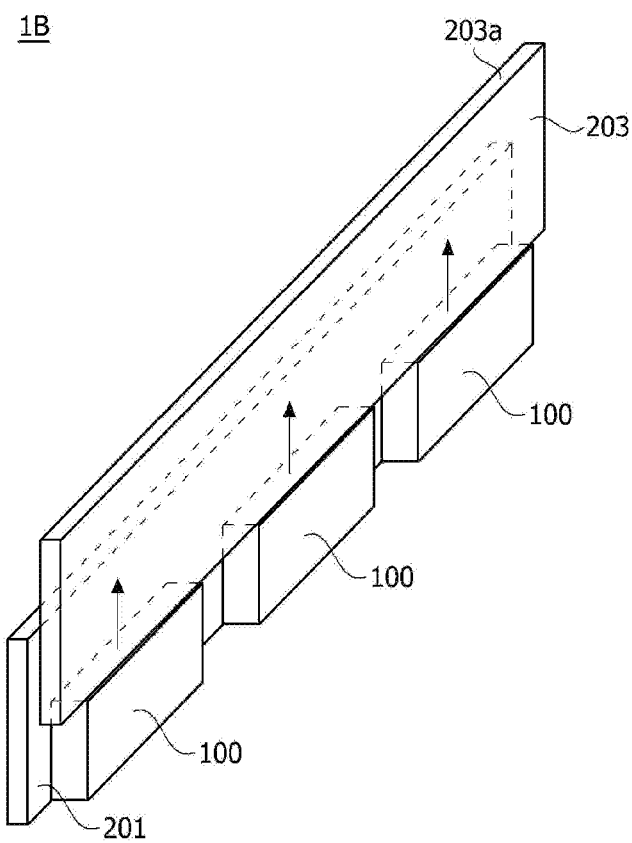
FIG. 8 is a conceptual view illustrating a lighting device according to another embodiment of the present invention.
Figure 9:
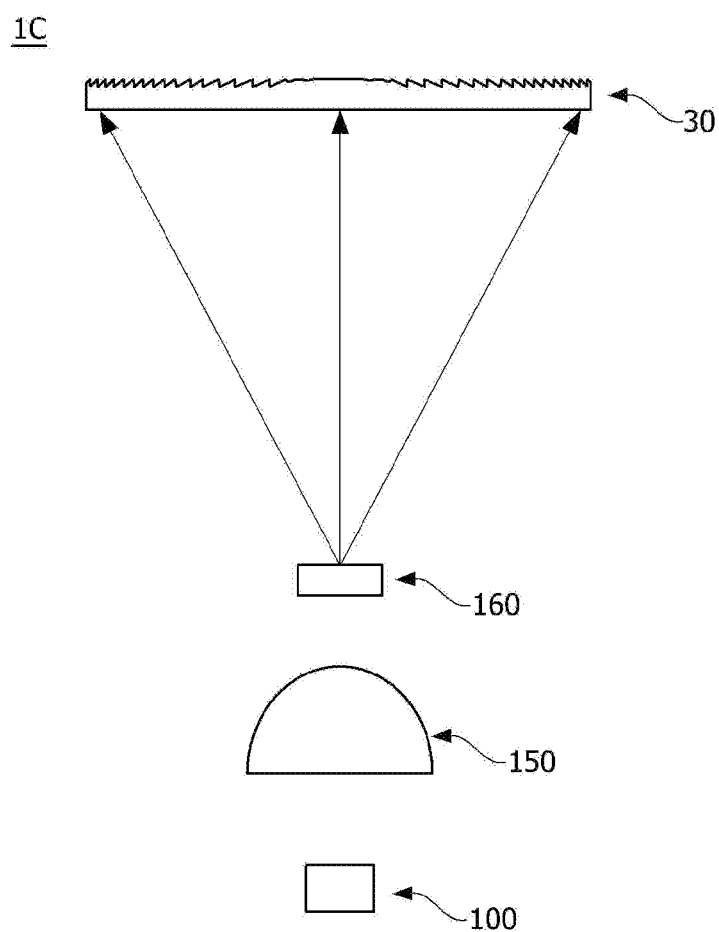
FIG. 9 is a conceptual view illustrating a lighting device according to still another embodiment of the present invention.
Figure 10:
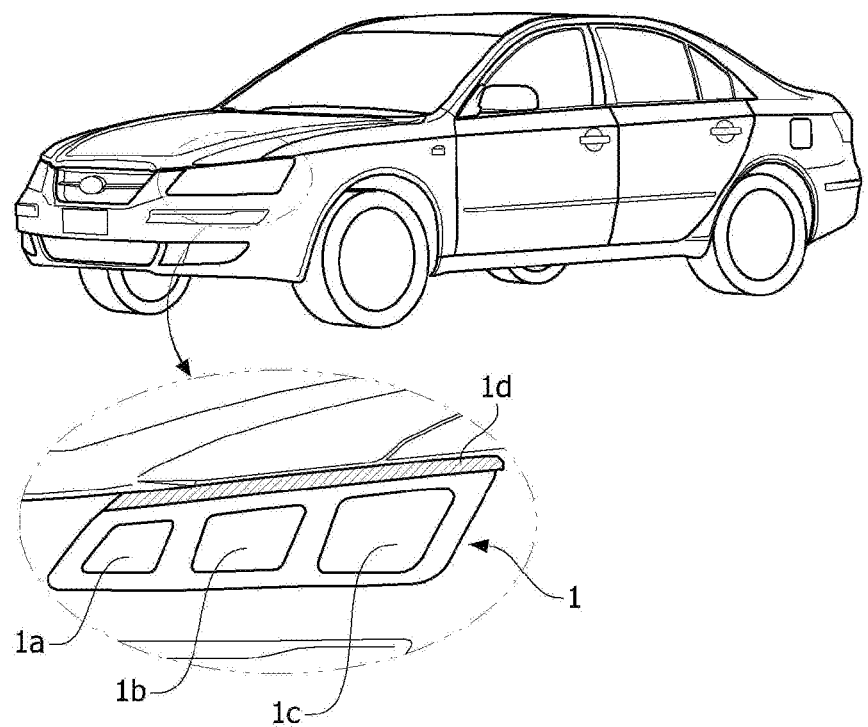
FIG. 10 is a view illustrating a lamp for an automobile according to an embodiment of the present invention.

FIG. 8 is a conceptual view illustrating a lighting device according to another embodiment of the present invention, FIG. 9 is a conceptual view illustrating a lighting device according to still another embodiment of the present invention, and FIG. 10 is a view illustrating a lamp for an automobile according to an embodiment of the present invention.

Referring to FIG. 8, a light source module 20 may include a circuit board 201, a plurality of light-emitting elements 100 disposed on the circuit board 201, and a light guide plate 203 having one surface which faces the light-emitting elements 100 and the other surface 203a which faces one surface.

The light-emitting element 100 may be a side surface LED but is not necessarily limited thereto. For example, the light-emitting element 100 may also be a general top-type LED.

The light guide plate 203 may have one surface which faces the light-emitting elements 100 and the other surface 203a which faces one surface. Here, a thickness of the light guide plate 203 may range from 1 mm to 10 mm. That is, the other surface 203a of the light guide plate 203 may be a light-emitting portion. However, the light guide plate 203 is not necessarily limited thereto, and a structure having a reflective partition formed in an empty space may be substituted for the light guide plate.

Although not illustrated in the drawing, a housing may seal the remaining region except for the other surface 203a of the light guide plate, and a lens 30 may be disposed on the other surface 203a of the light guide plate.

Referring to FIG. 9, a light source module 20 may include a light-emitting element 100, a first lens 150 disposed on the light-emitting element 100, and a second lens 160 disposed on the first lens 150.

Here, the first lens 150 may serve a light concentration function, and the second lens 160 may serve a light diffusion function. For example, the first lens 150 may be a cylinder lens and the second lens 160 may be a diffusion plate, but the first lens 150 and the second lens 160 are not limited thereto.

Light emitted from the light-emitting element 100 may be concentrated by the first lens 150, diffused by the second lens 160, and finally, converted to parallel light by a lens 30. The first lens 150 may be a convex lens having a cylindrical shape, and the second lens 160 may be a diffusion plate or diffusion member having a predetermined haze.

FIG. 10 is a view illustrating a lamp for an automobile according to an embodiment of the present invention.

The lighting device according to the embodiment may include a lamp, a head lamp, a street light, or the like. In a case in which the lighting device is used as a general lighting, the lighting device may further include a heat dissipation portion and a power supply which processes or converts an electric signal received from the outside to provide the processed or converted electric signal to a light source module.

In addition, the lighting device may also be included in a head lamp 1 for an automobile. The head lamp 1 may include at least one among a high beam 1a, a lower beam 1b, a turn signal lamp 1c, and a daytime running lamp 1d. According to the embodiment, the lighting device may be realized as the daytime running lamp 1d. However, the lighting device is not necessarily limited thereto, and the lighting device according to the embodiment may also be used for a stop lamp of a tail lamp. However, the lighting device may also be installed in various lamps for an automobile in addition thereto.

The invention claimed is:

1. A lighting device comprising:
    a light source module which extends in a first direction; and
    a lens which is disposed on the light source module and extends in the first direction, wherein the light source module includes a light guide member which extends in the first direction from a first end to a second end, and the light guide member having a cylindrical shape,
    a light-emitting element which is disposed at the first end of the light guide member,
    a reflection member which is disposed on an outer circumferential surface of the light guide member,
    the light guide member includes a light-emitting portion facing to the lens, and
    the light-emitting portion is a part of the outer circumferential surface of the light guide member where the reflection member is not disposed on the outer circumferential surface of the light guide member.

2. The lighting device of claim 1, further comprising a housing including a first accommodation portion in which the light source module is disposed and a second accommodation portion in which the lens is disposed.

3. The lighting device of claim 2, wherein the housing includes an opening which connects the first accommodation portion and the second accommodation portion,
    wherein the opening has a tapered shape in which an area is increased in a direction from the first accommodation portion to the second accommodation portion.

4. The lighting device of claim 1, wherein the lens converts divergent light emitted through the light-emitting portion to parallel light.

5. The lighting device of claim 4, wherein a width of the light-emitting portion ranges from 1 mm to 10 mm.

6. The lighting device of claim 1, wherein a width of the light-emitting portion is increased in a direction from the first end to the second end of the light guide member, and
    wherein a thickness of the light guide member is decreased in a direction from the first to the second end of the light guide member.

7. The lighting device of claim 6, wherein a first minimum distance from the first end to the lens is smaller than a second minimum distance from the second end to the lens.

8. The lighting device of claim 6, further comprising a submember which is disposed under the light guide member and has a thickness which is increased in the direction from the first end to the second end, and
    wherein a first minimum distance from the first end to the lens is equal to a second minimum distance from the second end to the lens.

9. The lighting device of claim 1, wherein the reflection member includes an opening extending in the first direction, and the light-emitting portion is an area where the light guide member is exposed by the opening of the reflection member.

10. The lighting device of claim 1, wherein the light guide member includes beads, and a density of the beads increases away from the first end of the light guide member.

* * * * *